(12) United States Patent
Chi

(10) Patent No.: US 10,681,901 B2
(45) Date of Patent: Jun. 16, 2020

(54) BIRD FEEDER WITH A HELICAL STRUCTURE ON A CONTAINER

(71) Applicant: Tzu Ying Chi, Hui Zhou (CN)

(72) Inventor: Tzu Ying Chi, Hui Zhou (CN)

( * ) Notice: Subject to any disclaimer, the term of this patent is extended or adjusted under 35 U.S.C. 154(b) by 222 days.

(21) Appl. No.: 15/936,419

(22) Filed: Mar. 26, 2018

(65) Prior Publication Data

US 2019/0289829 A1     Sep. 26, 2019

(51) Int. Cl.
  *A01K 39/01*     (2006.01)
  *A01K 39/012*   (2006.01)

(52) U.S. Cl.
  CPC ........ *A01K 39/0113* (2013.01); *A01K 39/012* (2013.01)

(58) Field of Classification Search
  CPC .. A01K 39/0113; A01K 39/01; A01K 39/012; A01K 39/00
  See application file for complete search history.

(56) References Cited

U.S. PATENT DOCUMENTS

| | | | | |
|---|---|---|---|---|
| 2,779,311 A * | 1/1957 | Hamilton | ............. | A01K 39/014 119/57.8 |
| 3,051,126 A * | 8/1962 | Merritt | ................ | A01K 39/0113 119/52.4 |
| 5,642,687 A * | 7/1997 | Nylen | ................ | A01K 39/0113 119/52.3 |
| D407,173 S * | 3/1999 | Marshall | ...................... | D30/124 |
| 6,098,348 A * | 8/2000 | Weaver | .............. | A01K 39/0113 119/52.3 |
| 6,213,054 B1 * | 4/2001 | Marshall | .............. | A01K 39/012 119/57.8 |
| 6,986,322 B2 * | 1/2006 | Lumpkin | ........... | A01K 39/0113 119/52.3 |
| 8,978,586 B1 * | 3/2015 | Carter | ................... | A01K 39/012 119/52.4 |
| 2005/0263085 A1 * | 12/2005 | Rich | ....................... | A01K 31/12 119/57.8 |
| 2013/0008383 A1 * | 1/2013 | Tu | ....................... | A01K 39/0113 119/51.01 |
| 2014/0373789 A1 * | 12/2014 | Hunter | ................. | A01K 39/012 119/57.8 |
| 2016/0088819 A1 * | 3/2016 | Sloan | ..................... | A01K 31/12 119/537 |
| 2017/0231202 A1 * | 8/2017 | Cote | ..................... | A01K 31/12 119/57.8 |

* cited by examiner

*Primary Examiner* — Magdalena Topolski
*Assistant Examiner* — Katelyn T Truong
(74) *Attorney, Agent, or Firm* — Chun-Ming Shih

(57) ABSTRACT

A bird feeder is provided with a containing structure including an internal space and at least one feeding opening on an outer surface of the containing structure and communicating with the internal space; a helical structure disposed on the outer surface of the containing structure in the form of a helix wherein pitch is defined as a distance from the crest of one thread of the helical structure to the next thereof; and at least one perch disposed on the outer surface of the containing structure and each disposed directly under the feeding opening.

8 Claims, 5 Drawing Sheets

BIRD FEEDER WITH A HELICAL STRUCTURE ON A CONTAINER

BACKGROUND OF THE INVENTION

1. Technical Field

The technical field relates to bird feeders, and more particularly relates to a bird feeder having a helical structure provided on a cylindrical container.

2. Description of Related Art

Conventionally, bird feeders are placed outdoors. A bird feeder comprising a cylindrical container filled with bird food (i.e., feed), a plurality of feeding openings on the container, and a plurality of perches each disposed under the feeding opening. A bird may stand on the perch for accessing the feed through the feeding opening.

It is understood that animals such as squirrels may access the feed because the bird feeder is placed outdoors. This, however, may compromise the purpose of feeding birds.

There is a type of bird feeder having a hinged door on the feeding opening for preventing animals from accessing the feed. However, it may cause difficulties of feed birds and greatly increase the manufacturing cost.

Thus, the need for improvement still exists.

SUMMARY OF THE INVENTION

The disclosure is directed to a bird feeder for eliminating drawbacks including those associated with the conventional art.

It is therefore one object of the invention to provide a bird feeder comprising a containing structure including an internal space and at least one feeding opening on an outer surface of the containing structure and communicating with the internal space; a helical structure disposed on the outer surface of the containing structure in the form of a helix wherein pitch is defined as a distance from the crest of one thread of the helical structure to the next thereof; and at least one perch disposed on the outer surface of the containing structure and each disposed directly under the feeding opening.

One of the exemplary embodiments, the containing structure comprises a cylindrical container with the internal space disposed therein, the container including a top opening for putting feed into the internal space, and a covering structure releasably fastened on the top opening of the container.

One of the exemplary embodiments, the container further comprises at least one inclined boards each extending downward from a top edge of the feeding opening into the internal space.

One of the exemplary embodiments, the covering structure includes a cover releasably fastened on the top opening, a lanyard having a lower end secured to the cover, and a hanging member formed at an upper end of the lanyard.

One of the exemplary embodiments, the hanging member is a loop.

One of the exemplary embodiments, the hanging member is a hook.

One of the exemplary embodiments, the helical structure includes an inner edge formed with the outer surface of the container in the form of a helix, an outer edge, and an upper surface interconnecting the inner edge and the outer edge; and wherein the upper surface is smooth and gradually downward, outward extends from the inner edge to the outer edge.

One of the exemplary embodiments, the upper surface is further curved.

One of the exemplary embodiments, the number of the feeding opening is more than one and the feeding openings are arranged in the form of a helix, and wherein each feeding opening has a corresponding perch.

One of the exemplary embodiments, both each feeding opening and its corresponding perch are disposed in the pitch.

The invention has the following advantages and benefits in comparison with the conventional art:

The lightweight, cylindrical perch only allows a smaller bird to stably stand thereon and prevent a larger bird or an animal from stably standing thereon, thereby preventing these larger birds or animals from accessing the feed. The inclined boards each extending downward from a top edge of the feeding opening into the space can prevent the feed from coming out through the feeding openings. A smaller bird may stand on the perch to access the feed through the feeding opening in the pitch. As such, many smaller birds may gather at the bird feeder. Further, there is no interference with smaller birds standing on the perches of different elevations. The invention is aesthetic and attractive to the people.

The above and other objects, features and advantages of the invention will become apparent from the following detailed description taken with the accompanying drawings.

DETAILED DESCRIPTION OF THE INVENTION

Embodiments of the invention will now be described, by way of example only, with reference to the accompanying drawings.

Figure 1:
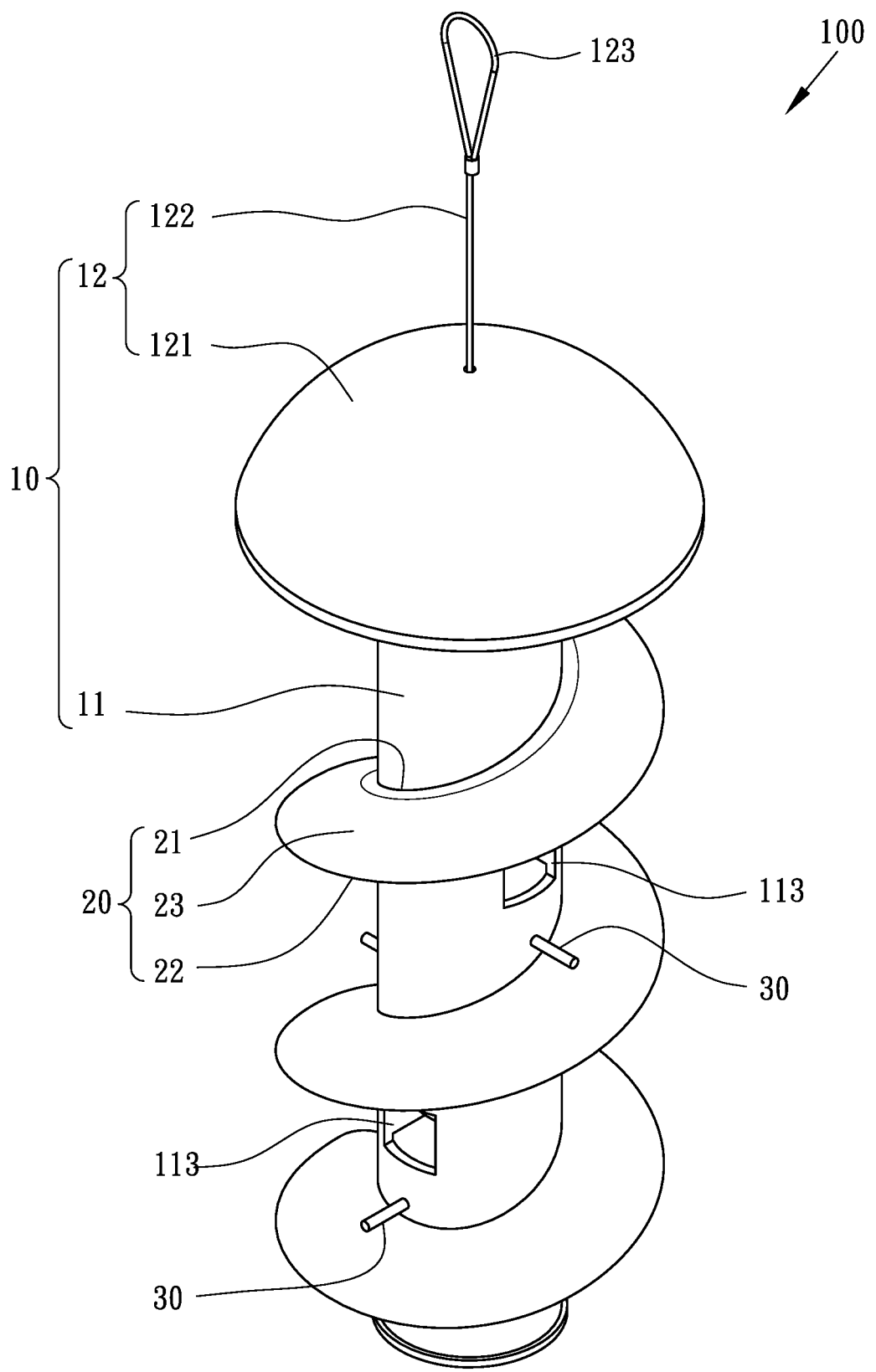
FIG. 1 is a perspective view of a bird feeder according to the invention.
Figure 2:
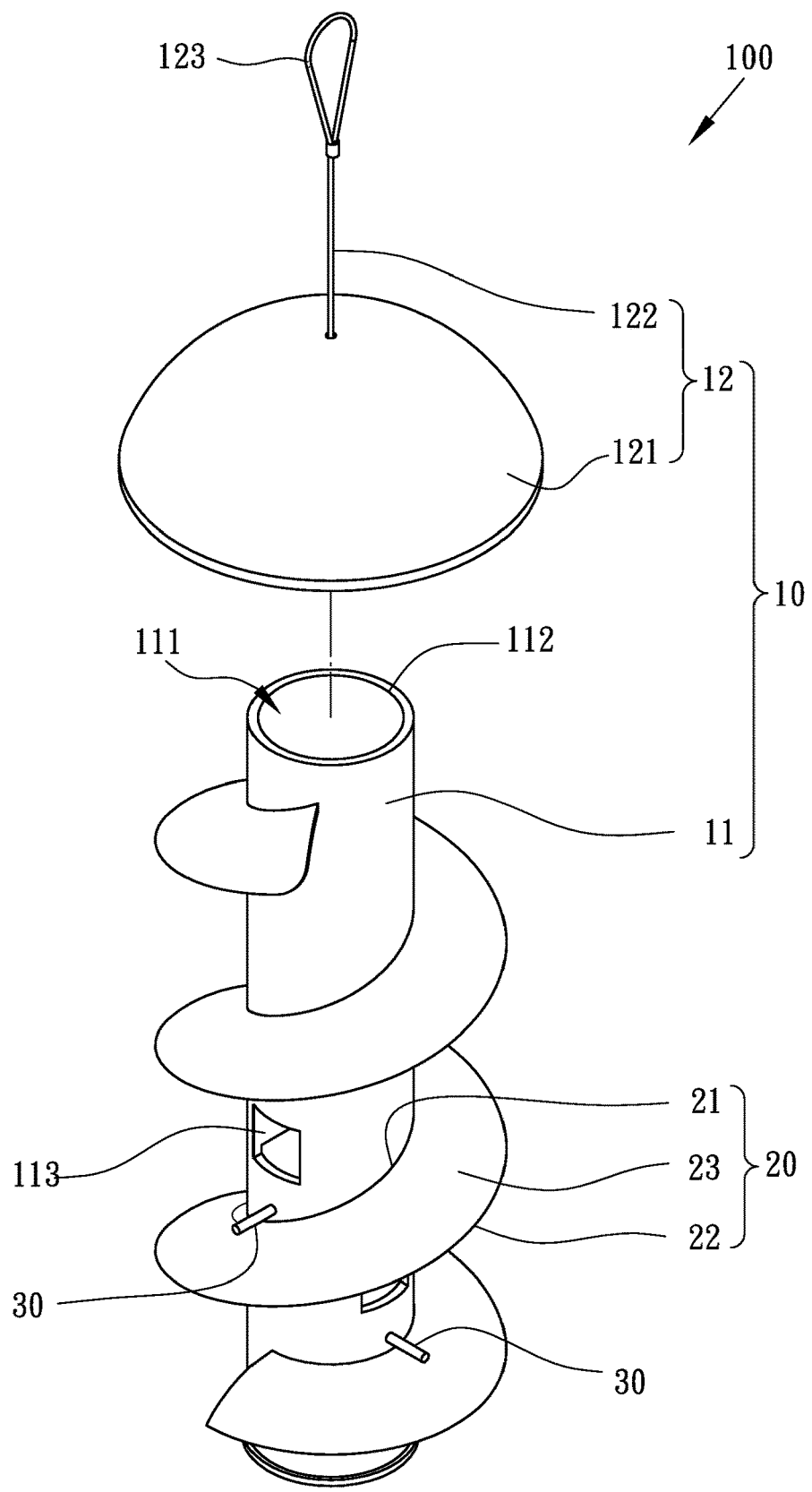
FIG. 2 is an exploded perspective view of the bird feeder.
Figure 3:
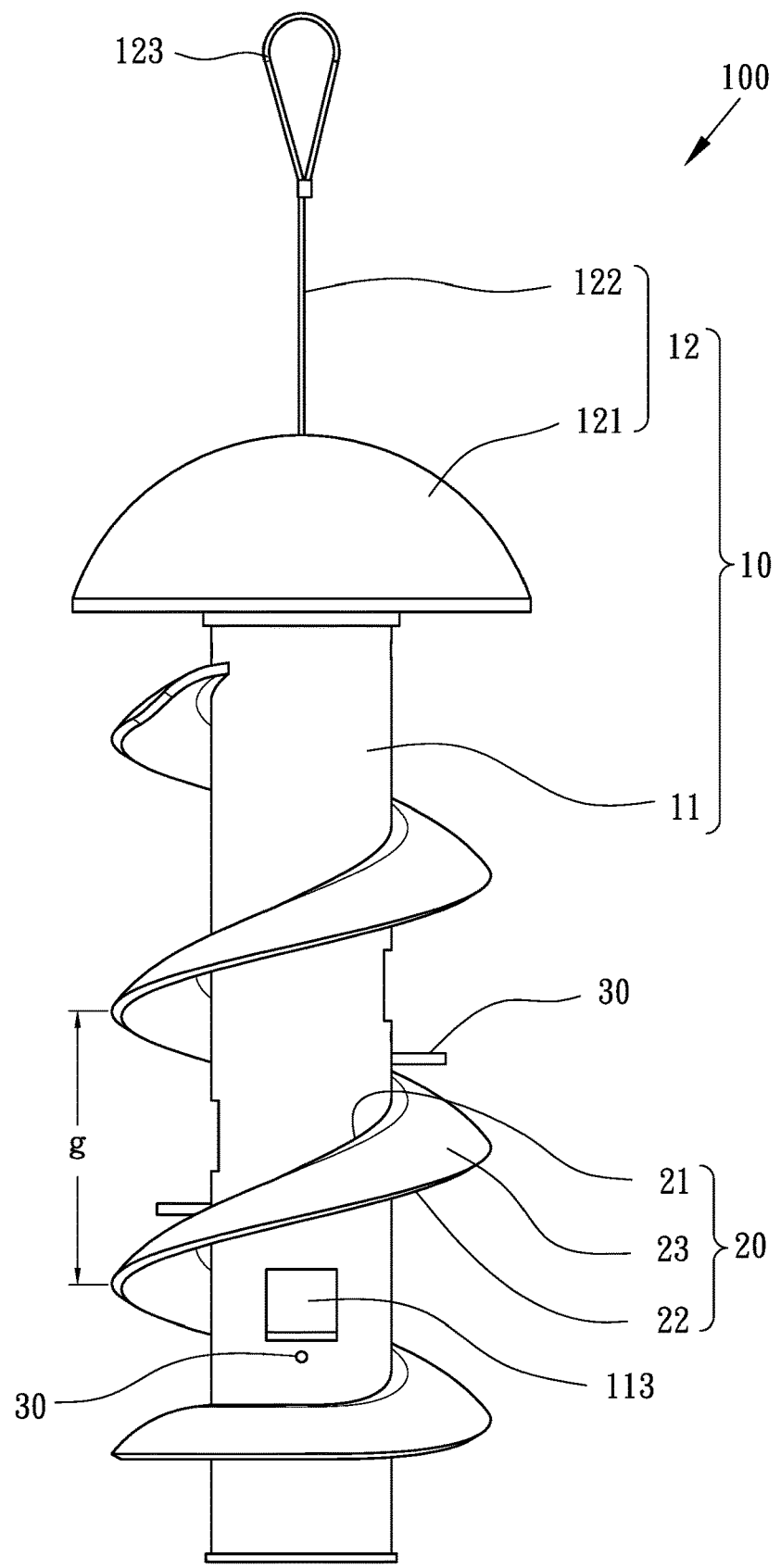
FIG. 3 is a side elevation of the bird feeder.
Figure 4:
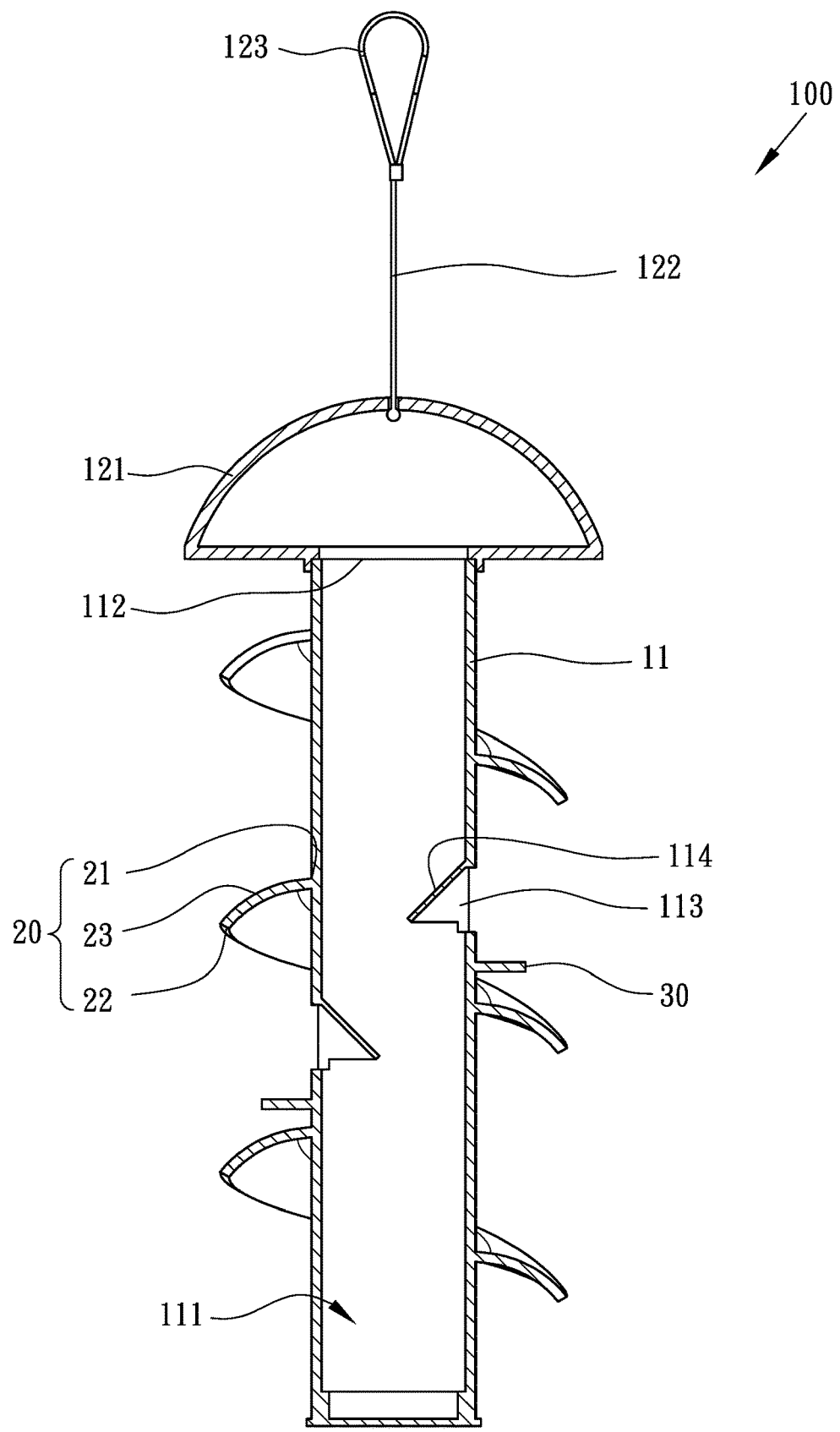
FIG. 4 is a longitudinal sectional view of the bird feeder.
Figure 5:
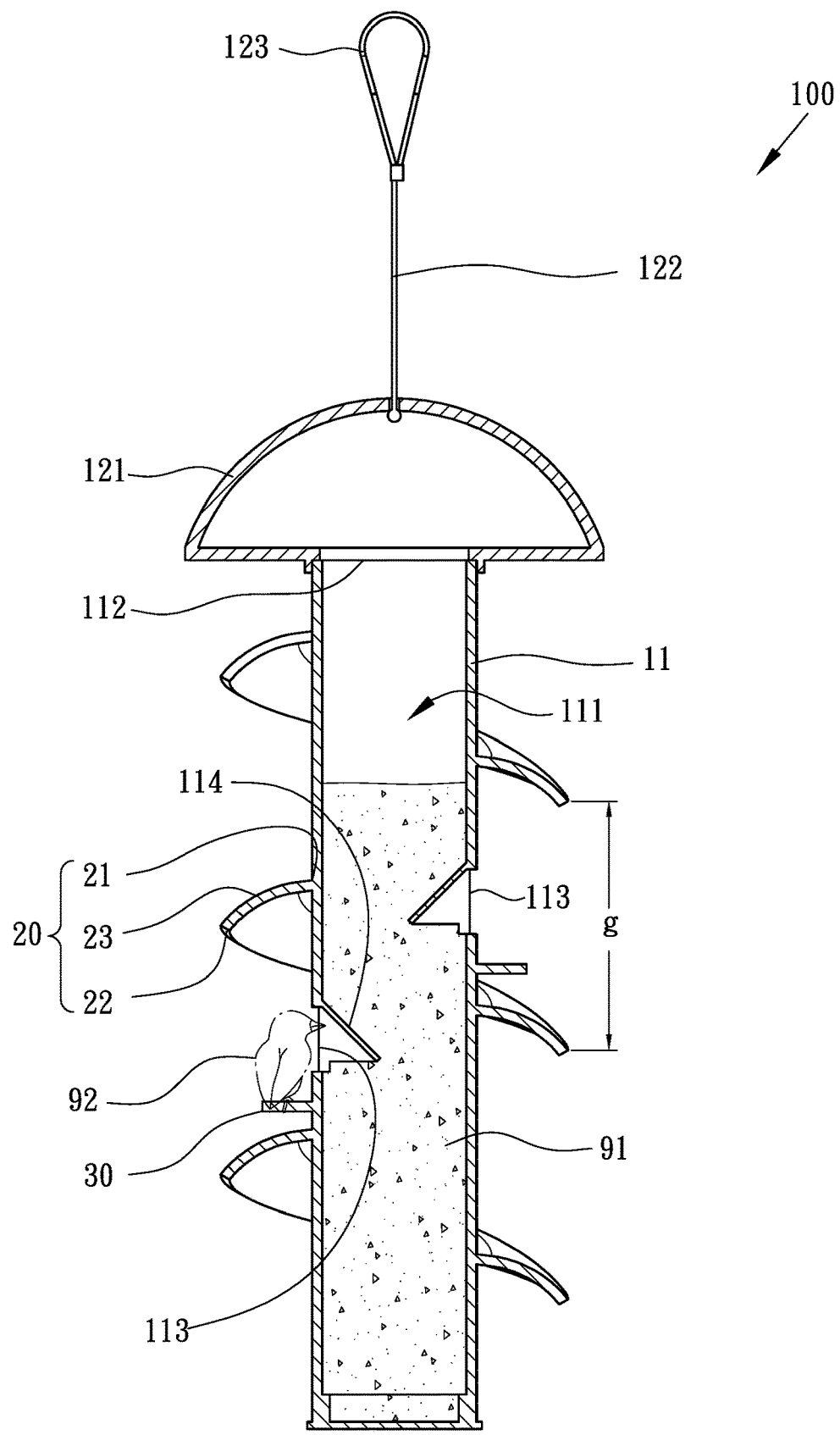
FIG. 5 is a view similar to FIG. 4 with the container filled with feed and a bird rested on a perch.

Referring to FIGS. 1 to 5, a bird feeder 100 in accordance with the invention comprises a containing structure 10, a helical structure 20 and a plurality of perches 30.

As shown in FIGS. 1 to 4 specifically, the containing structure 10 comprising a cylindrical container 11 including an internal space 111, a top opening 112 for allowing feed to fill into the space 111, a plurality of feeding openings 113 provided on a cylindrical surface of the container 11, and a plurality of inclined boards 114 each extending downward from a top edge of the feeding opening 113 into the space 111; and a covering structure 12 including a dome-shaped cover 121 releasably fastened on the top opening 112, a lanyard 122 having an enlarged lower end passing through a center of the cover 121 to secure to the cover 121, and a loop 123 formed at the other upper end of the lanyard 122.

As shown in FIGS. 1 to 4 specifically, the helical structure 20 is provided on an outer surface of the container 11 in the form of a helix. Pitch g is the distance from the crest of one thread to the next. The helical structure 20 includes an inner edge 21 formed with the outer surface of the container 11 in the form of a helix, an outer edge 22 and an upper surface 23 interconnecting the inner edge 21 and the outer edge 22. The inner edge 21 is spaced from the feeding openings 113. That is, any feeding opening 113 of the container 11 is disposed in the pitch g. The upper surface 23 is curved and smooth. The upper surface 23 gradually downward, outward extends from the inner edge 21 to the outer edge 22. Thus, the inner edge 21 has an elevation greater than that of the outer edge 22.

As shown in FIGS. 1 to 4 specifically, the perch 30 is shaped as a cylinder and perpendicular to the outer surface of the container 11. Each perch 30 is disposed under a corresponding feeding opening 113. In the embodiment, the number of the perches 30 is three and the number of the feeding openings 113 is also three. In other embodiments, there are more three feeding openings 113 are provided on the outer surface of the container 11 and each feeding opening 113 has a corresponding perch 30 disposed thereunder. Above has described components of the bird feeder 100 of one embodiment. Use of the bird feeder 100 will be described in detail below.

First, a user may detach the covering structure 12 from the container 11. Next, the user may put feed (i.e., bird food) 91 into the space 111 through the top opening 112 (see FIG. 5). Then the user may fasten the covering structure 12 and the container 11 together again. Next, the user may put the container 11 on the ground or put the loop 123 on a tree branch. A bird 92 may stand on the perch 30 to access the feed 91 in the space 111 through the feeding opening 113.

The provision of the helical structure 20 on the container 11 can prevent larger birds or squirrels from eating the feed 91 through the feeding opening 113. Further, the smooth upper surface 23 gradually extending downward outward from the inner edge 21 to the outer edge 22 can prevent animals such as squirrels from stably standing on the upper surface 23, thereby preventing the squirrels from accessing the feed 91 through the feeding opening 113. Furthermore, the pitch g can be designed to have an optimum distance to prevent larger birds from accessing the feed 91. This has the benefits of allowing smaller birds to access the feed 91 and preventing larger birds from accessing the feed 91 if their sizes are greater than the pitch g.

The invention has the following advantages: Its design is simple. Its manufacturing cost is inexpensive. The lightweight, cylindrical perch 30 only allows a smaller bird to stably stand thereon and prevents a larger bird or an animal from stably standing thereon, thereby preventing these larger birds or animals from accessing the feed 91. The inclined boards 114 each extending downward from a top edge of the feeding opening 113 into the space 111 can prevent the feed 91 from coming out through the feeding openings 113.

It is noted that the loop 123 for hanging on something may be shaped as a hook in other embodiments.

While the invention has been described in terms of preferred embodiments, those skilled in the art will recognize that the invention can be practiced with modifications within the spirit and scope of the appended claims.

What is claimed is:

1. A bird feeder comprising:
 a containing structure including an internal space and at least one feeding opening on an outer surface of the containing structure and communicating with the internal space;
 a helical structure formed as a helical plate and being attached to the outer surface of the containing structure, wherein a pitch is defined as a distance from the crest of one thread of the helical structure to the next thereof, wherein the helical structure includes an inner edge, an outer edge, and an upper surface interconnecting the inner edge and the outer edge; and wherein the upper surface is smooth and gradually extends downward and outward from the inner edge to the outer edge; and
 at least one perch disposed on the outer surface of the containing structure and the at least one perch disposed directly under the at least one feeding opening.

2. The bird feeder as claimed in claim 1, wherein the containing structure comprises a cylindrical container with the internal space disposed therein, the cylindrical container including a top opening for putting feed into the internal space, and a covering structure releasably fastened on the top opening of the cylindrical container.

3. The bird feeder as claimed in claim 2, wherein the cylindrical container further comprises at least one inclined board, each of the at least one inclined board extending downward from a top edge of the feeding opening into the internal space.

4. The bird feeder as claimed in claim 2, wherein the covering structure includes a cover releasably fastened on the top opening, a lanyard having a lower end secured to the cover, and a hanging member formed at an upper end of the lanyard.

5. The bird feeder as claimed in claim 4, wherein the hanging member is a loop.

6. The bird feeder as claimed in claim 1, wherein the upper surface is further curved.

7. The bird feeder as claimed in claim 1, wherein the at least one feeding opening comprises a plurality of feeding openings and the plurality of feeding openings are arranged in the form of a helix, and wherein the at least one perch comprises a plurality of perches, and wherein each of the plurality of feeding openings has a corresponding perch of the plurality of perches.

8. The bird feeder as claimed in claim 1, wherein both the at least one feeding opening and its corresponding at least one perch are disposed in the pitch.

* * * * *